V. G. DARTOIS.
MACHINE FOR CUTTING BEVEL GEAR WHEELS WITH HELICAL OR STRAIGHT TEETH.
APPLICATION FILED JAN. 19, 1920.
1,409,086.
Patented Mar. 7, 1922.
7 SHEETS—SHEET 3.
Fig. 7.
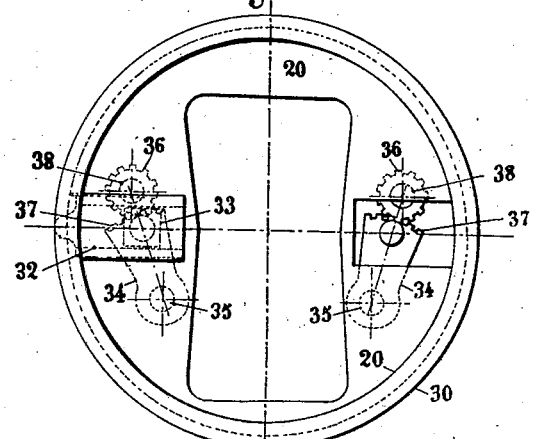
Fig. 3.
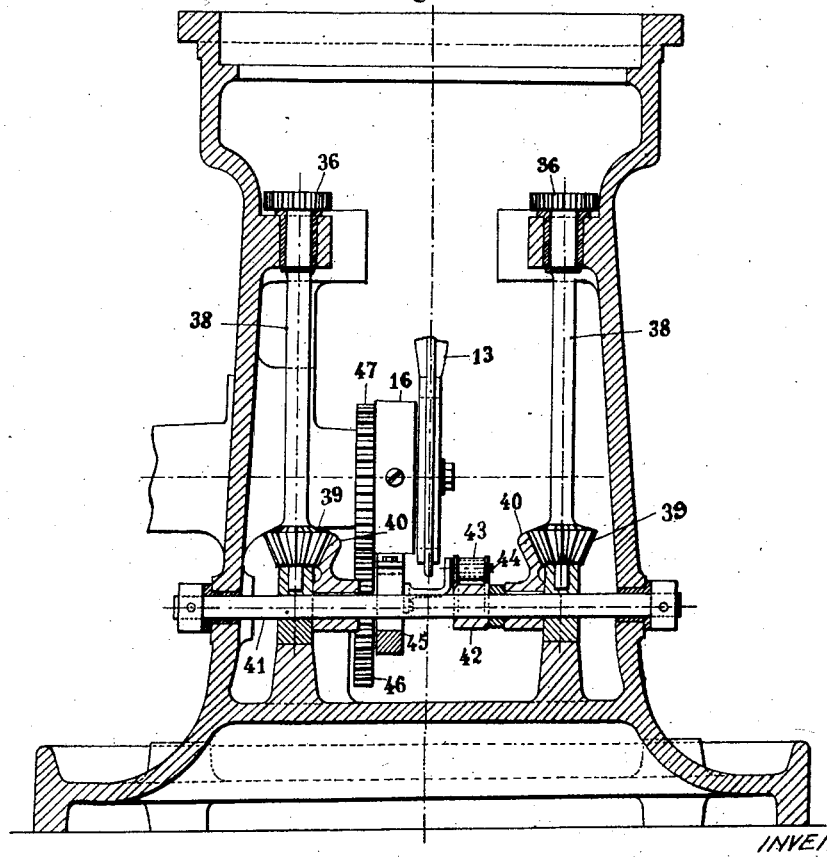
INVENTOR
VICTOR GASPARD DARTOIS.
BY 
ATTORNEYS.

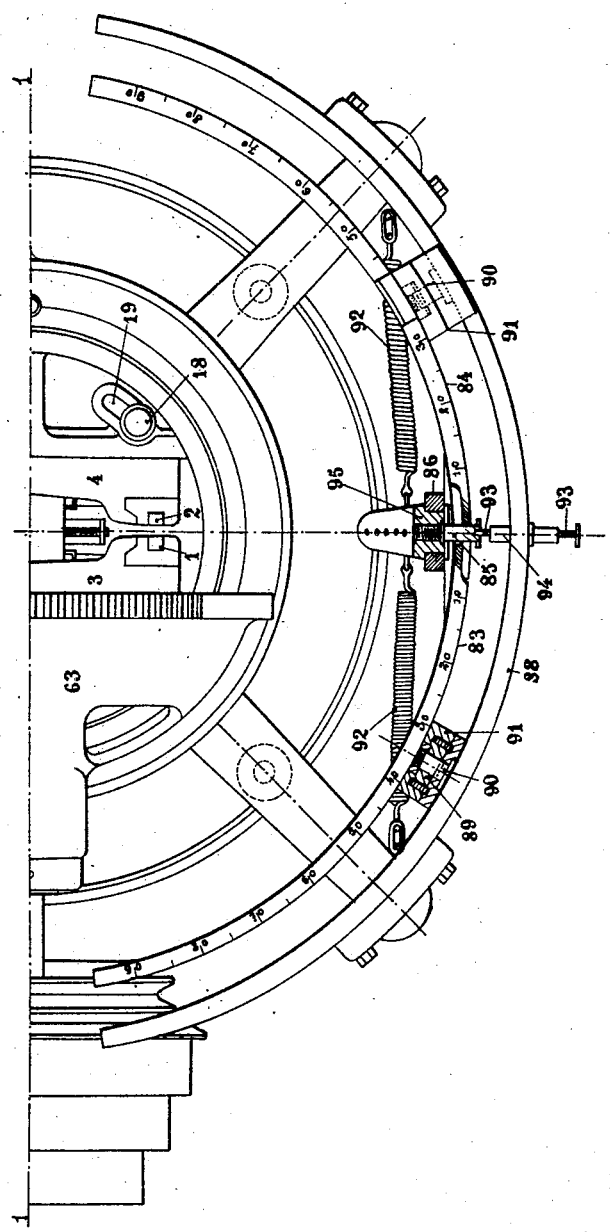

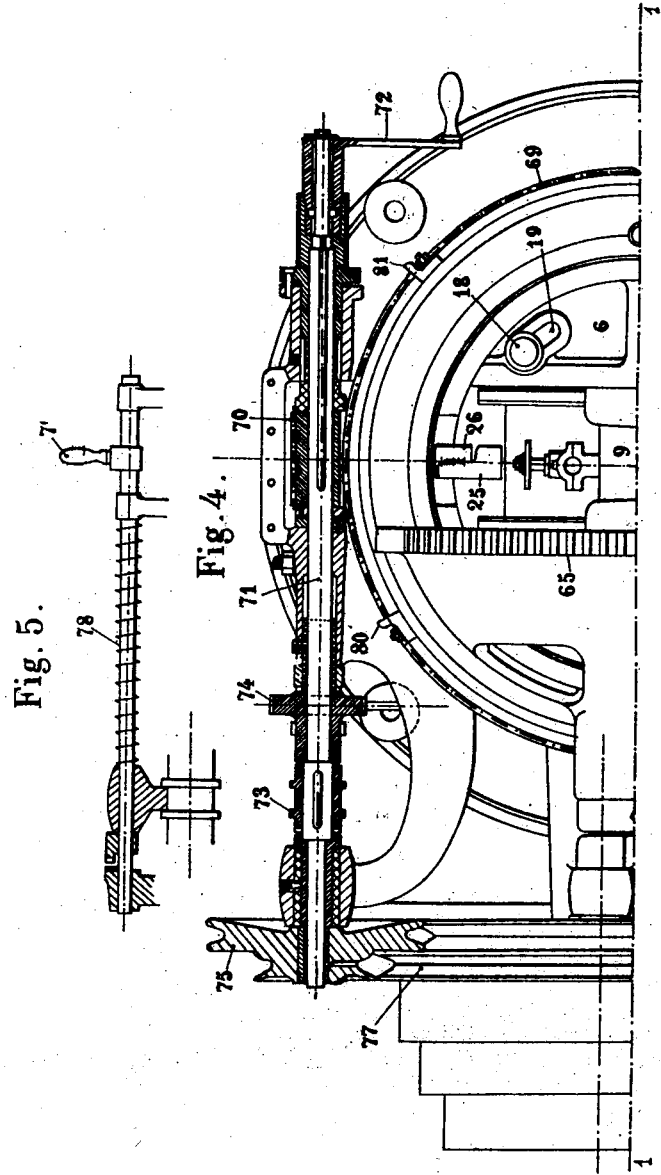

V. G. DARTOIS.
MACHINE FOR CUTTING BEVEL GEAR WHEELS WITH HELICAL OR STRAIGHT TEETH.
APPLICATION FILED JAN. 19, 1920.
1,409,086.
Patented Mar. 7, 1922.
7 SHEETS—SHEET 6.
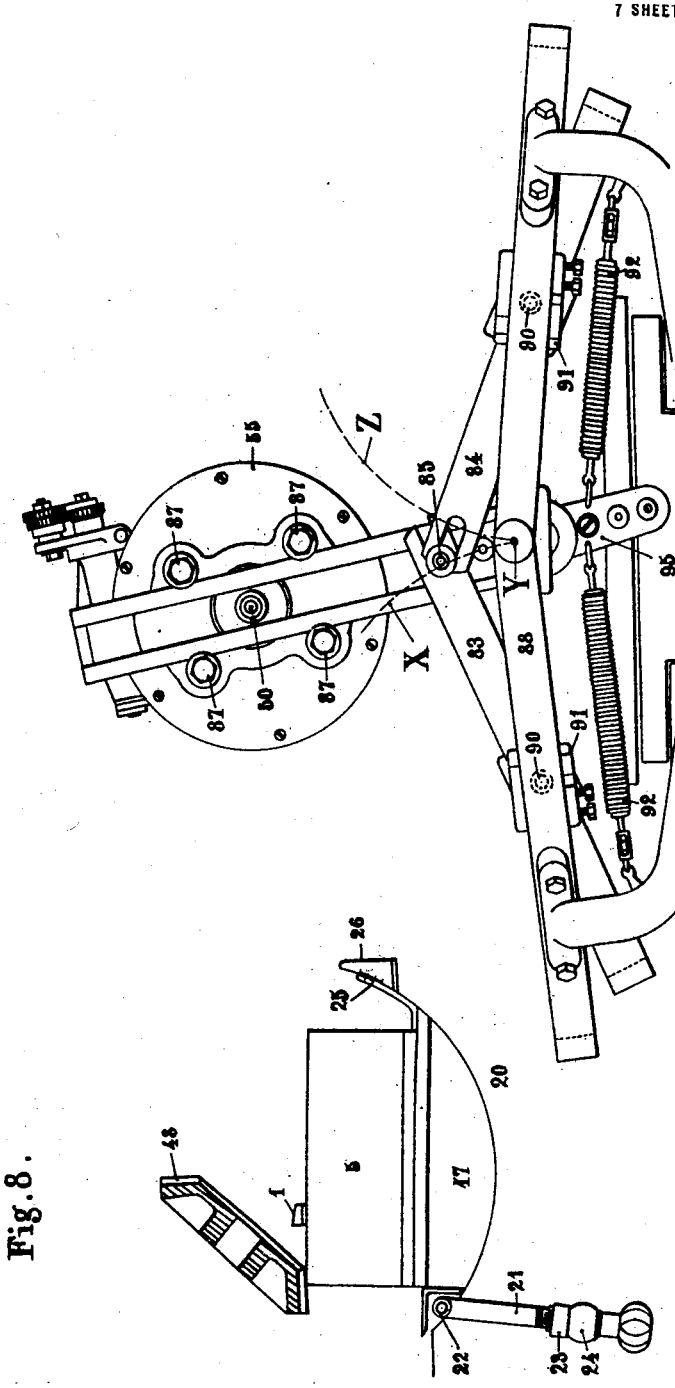
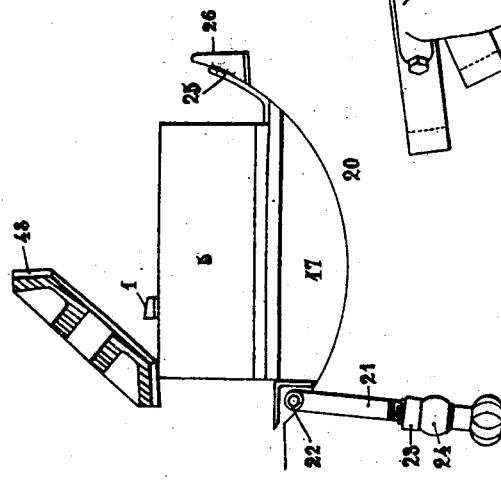
INVENTOR
VICTOR GASPARD DARTOIS.
BY Munn & Co
ATTORNEYS.

V. G. DARTOIS.
MACHINE FOR CUTTING BEVEL GEAR WHEELS WITH HELICAL OR STRAIGHT TEETH.
APPLICATION FILED JAN. 19, 1920.
1,409,086. Patented Mar. 7, 1922.
7 SHEETS—SHEET 7.
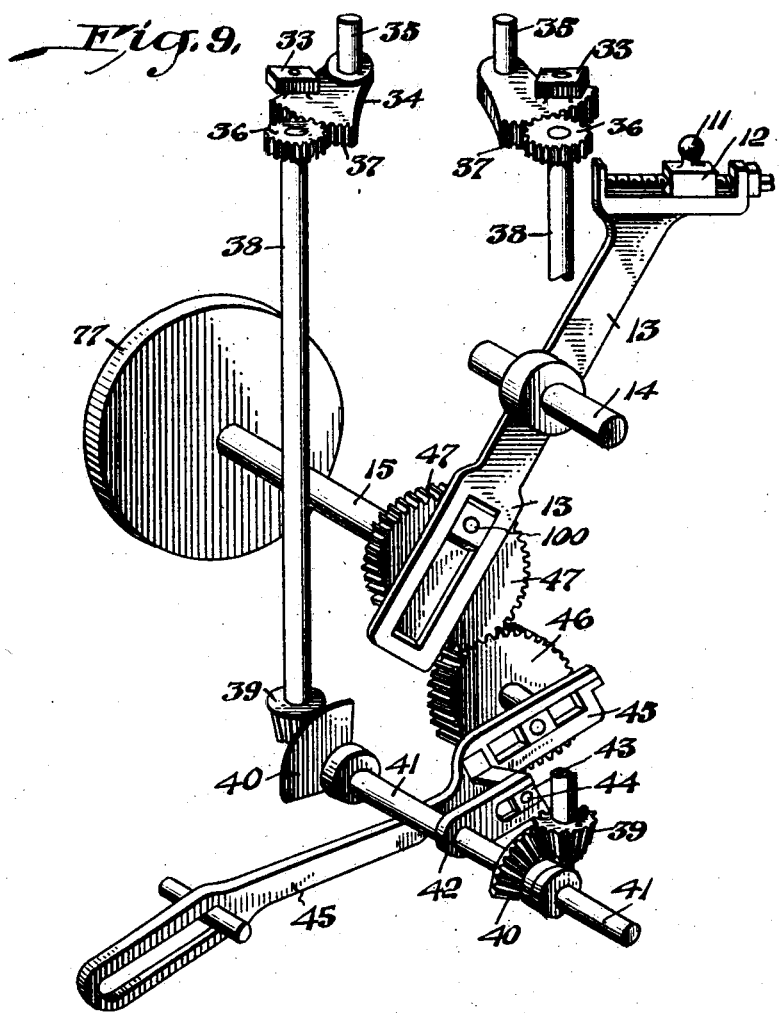
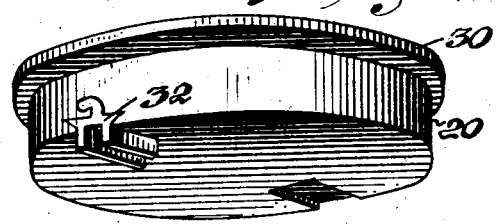
Inventor:
VICTOR GASPARD DARTOIS.
BY Munn & Co
ATTORNEYS

UNITED STATES PATENT OFFICE.

VICTOR GASPARD DARTOIS, OF PARIS, FRANCE.

MACHINE FOR CUTTING BEVEL GEAR WHEELS WITH HELICAL OR STRAIGHT TEETH.

1,409,086. Specification of Letters Patent. Patented Mar. 7, 1922.

Application filed January 19, 1920. Serial No. 352,343.

*To all whom it may concern:*

Be it known that I, VICTOR GASPARD DARTOIS, of 4 Boulevard Malesherbes, Paris, France, manufacturer, have invented a Machine for Cutting Bevel Gear Wheels with Helical or Straight Teeth, of which the following is a full, clear, and exact description.

This invention has for its object a machine for cutting bevel gear wheels with helical teeth and also capable of cutting bevel gear wheels with straight teeth.

The machine constructed in accordance with this invention rests on the principle that, when a tool having a reciprocating motion and correctly cutting straight bevel gear teeth is animated, in addition to the radial motion generating this form of tooth, with a circular and also reciprocating motion about the apex of the cone, and is under the subjection of the radial motion according to a constant law, this tool cuts teeth the axis of which has a contour which depends on the law chosen; this contour may be (in the plan of the plane wheel) either circular, or in the form of an Archimedes spiral, or in the form of a logarithmic spiral. It thus cuts teeth similar to helical teeth, that is to say allowing to obtain a continuous gearing action, even when the outline is not rigorously the logarithmic helix. In fact, the radial movement, by its very nature and the means used for obtaining it, produces the correction of the transverse profile of the teeth at each distance from the apex of the cone and, therefore, it is of little consequence whether the circular movement affects one contour more than another, provided it is constantly maintained under the subjection of the radial movement by an invariable law, whatever the latter may be, the function of this circular movement being simply to produce a different contour from the straight radial line, so that the different parts of a flank of one and the same tooth do not come in contact simultaneously but successively when the cut gear is put in use.

The radial movement of the tool being exact and the circular movement being still under the subjection of the former, the teeth of two gears successively cut for gearing together will be necessarily exact throughout, which result has not been obtained up to now with any machine for cutting bevel wheels with helical teeth, the known types of the latter working only by approximation with, sometimes, a rather large play or clearance.

The principle of the radial movement of the tool is the cutting by rotation (Sang's method) by means of two tools working simultaneously and forming both flanks of one tooth by hollowing out both spaces of tooth on opposite sides of this tooth and not by means of a single tool (which would cause a considerable waste of time) nor by means of two tools cutting simultaneously both flanks of one space of tooth (which does not allow the cutting of small diametral pitch). Both tools, except for the required convergence for the formation of conical teeth, are completely integral with each other as far as their movement and adjustment is concerned, the tool carrying carriages being supported by a common base in the shape of a cradle, resting in a curved recess and held by a device allowing the precise angular adjustment in the plane of the axis of the tooth to be formed. This recess is provided in a kind of bowl carried by the frame and capable of pivoting about the axis of the plane wheel, so as to obtain the additional circular movement. The connection between this bowl and the mechanism is formed by a member movable at will, so that the machine may also cut exact straight teeth, by the removal of this movable member and the locking of the bowl.

A form of carrying out the invention into practice is illustrated, by way of example in the accompanying drawings, in which Fig. 1 is a vertical section, at right angles to the driving axis and according to line 1—1 of Fig. 2;

Fig. 3 is a vertical section through a plane parallel to that of Fig. 2, the section being made according to line 3—3 of Fig. 1;

Fig. 4 is a plan view;

Figure 1:
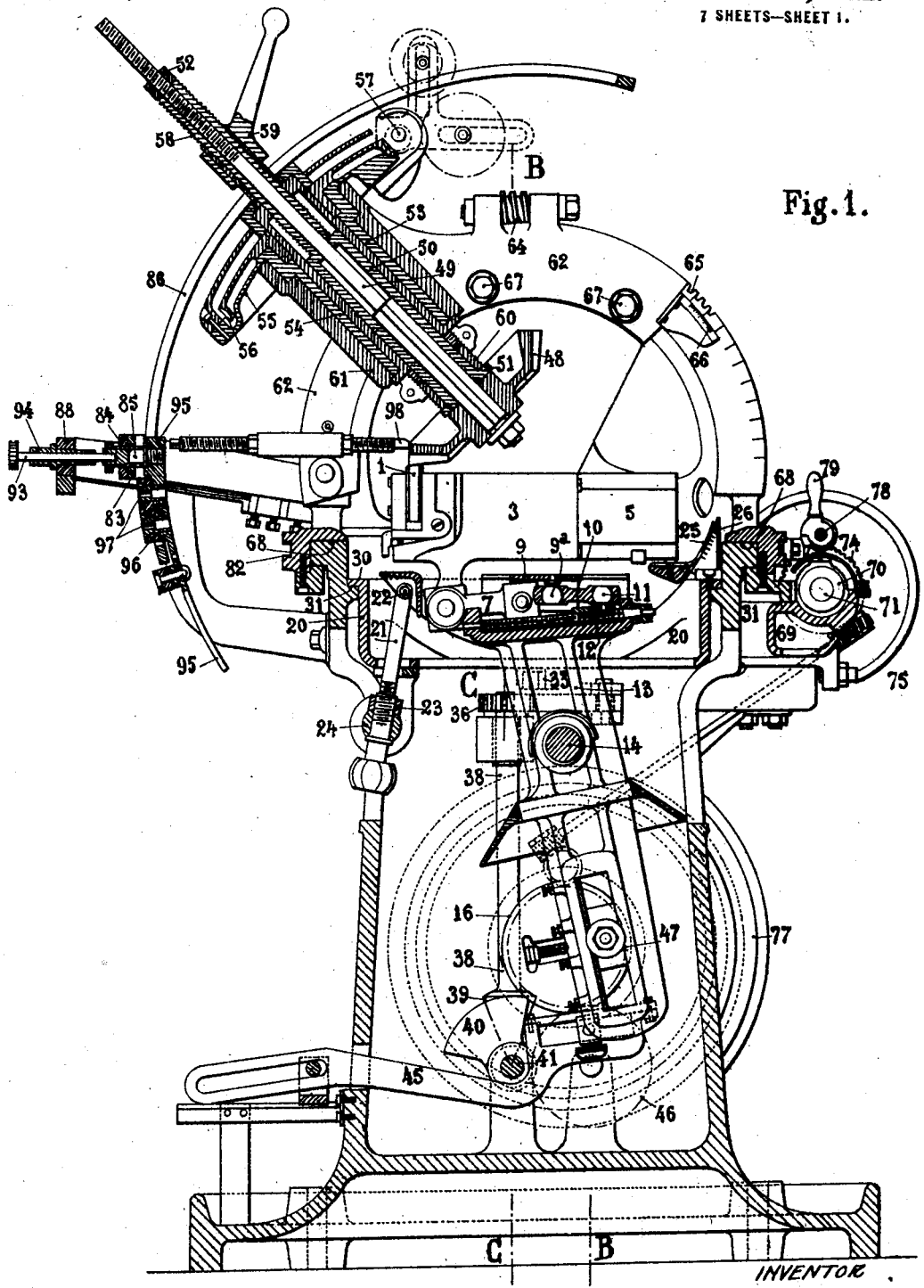

Figs. 5 to 7 illustrate details; Fig. 5 shows separately the operating rod of the clutch sleeve producing the rotation of the carrier for starting the cutting; Fig. 6 illustrates the system of levers for obtaining the driving movement and controlling the movement of the cutting wheel; Fig. 7 shows in plan view the bowl and the mechanism controlling its rotation.

Fig. 8 illustrates diagrammatically the arrangement allowing the angular adjustment of the cradle or saddle and of the tools in the vertical plan.

Figure 9 is a perspective diagrammatical view of the operating mechanism;

Figure 10 is a perspective view of the bowl with the slide in one of the recesses thereof.

With reference to these drawings, it will be seen that the two vertical planing tools 1 and 2 are supported by the carriages 3 and 4 and that open space between the tooth is of such a form that it forms the hollow part and the plane side of a conical gearing tooth with an angle at the top of 180°. The carriages 3 and 4 are guided by carriage-guides 5 and 6 and are controlled by links 7, 8 mounted, on the one hand, between balls integral with the carriages 3 and 4 and, on the other hand, between other balls integral with a central slide block 9. This slide-block 9 carries a third ball 9ª connected by a third link 10 to a ball 11 integral with a nut 12 carried by the rocking lever 13 pivoted on the axis 14 and the lower arm of which is controlled from the driving shaft 15 by a crank plate 16 the excentricity of which may be adjusted by a screw 16ª and a nut 16ᵇ. The carriage-guides 5 and 6 rest on the cradle or saddle 17; they are secured thereto by four screws 18 (Figs. 2 and 4) and are provided with a circular groove and tongue centering device as well as with holes 19 for the passage of the screws 18, so as to allow of giving them either the necessary convergence for the cutting of bevel wheels or the parallelism for the cutting of cylindrical wheels. The saddle rests on a curved recess the shape of which corresponds to that of the bowl 20, as clearly illustrated in Figs. 1 and 8.

The base of the saddle may be angularly displaced in this recess for raising the tools 1 and 2, according to the depth of the teeth to be obtained; this displacement is produced by means of a rod 21 hinged at 22 to the base of the cradle, this rod being screw threaded and provided with a screw-threaded sleeve 23 having an operating knob; this sleeve is rotatably fitted (but cannot move longitudinally) in a member 24 hinged to the bowl 20.

The base of the saddle is provided at the top with a graduated member 25 movable opposite a fixed graduation 26 of the bowl and allowing the precise angular adjustment of the saddle. The latter may be locked in any given position by means of two locking pins 27 (Fig. 2), each provided with an eccentric journal 28 with a plug 29 and which, by angular displacement by means of a socket-wrench, may exert on the base of the saddle 17 a clamping pressure sufficient for holding it stationary on its curved seat.

The bowl 20 is provided with a ledge 30 by means of which it rests on a circular support 31 of the frame of the machine; this bowl is thus centered on the vertical axis of the machine and may rotate about the said axis. At its lower part, the bowl 20 is provided, on a diameter parallel to the driving shaft 15, with two dovetail-shaped recesses (Fig. 7) and a slide 32 may be pushed, through an opening in the frame, in one or the other of the recesses, according as the helical teeth must be left-hand or right-hand teeth. In the slide 32 is arranged a slide-block 33 (Figs. 2 and 7) carried by a crank 34 suitably pivoted at 35 and actuated by a cylindrical pinion 36 gearing with a toothed segment 37 integral with the crank 34. The pinion 36 is carried by a vertical shaft 38 supporting, at its lower part, a bevel pinion 39 gearing with a bevel sector 40. The whole of the parts 33 to 40 is symmetrically repeated on each side of the machine. Both bevel sectors 40 are mounted on the same shaft 41 which carries a slide 42; the latter receives a slide-block 43 mounted on a crank-pin 44 which is secured to a second lever 45 actuated by a crank mounted on a toothed disc 46 gearing with a toothed ring 47 integral with the crank plate 16. The disk 46 and ring 47 have the same number of teeth, so that, during the rotation of the driving shaft 15, the tools 1 and 2 receive, through the medium of the lever 13 and links 7—8, a radial reciprocating movement whilst, through the intermediary of the parts 44, 43, 42, 41, 40, 39, 38, 36, 37, 34 and 20, they receive a circular reciprocating movement, invariably connected to the former movement; for a working stroke of the tools in the radial direction, the circular movement takes place in one direction or the other, according as the slide 32 is arranged on one side or the other of the bowl 20. By completely removing the slide 32, the bowl ceases to be driven by the members 44 to 33 and it may be locked, which allows also of cutting straight teeth. The gear blank 48 is carried (Fig. 1) by a puppet with a dividing device and comprising a rod 49 forming a mandrel, fitting in a socket 50 and carrying a washer 51 between which and the end of the socket 50 is held the body of the wheel, by means of a screw-threaded part with a clamping nut 52 presented by the mandrel rod. The socket 50 is fitted in a rotary sleeve 53 carried by a part 54, forming a hub, of a box 55 containing the dividing device. This device comprises a dividing toothed wheel 56 secured on the sleeve 53 and an operating worm 57 gearing with this dividing wheel and by the rotation of which the sleeve 53 with the mandrel-carrying socket 50 and the body of the wheel 48 may be caused to turn through a predetermined angle when the body of the wheel is to be rotated on itself for starting the cutting of a new tooth.

The mandrel-carrying socket 50 is longitudinally adjustable in the sleeve 53 for placing in position the body of the wheel, this adjusting movement being obtained by means of a screw-threaded portion 58 presented by the said socket 50 and carrying a rotatable nut 59, but which cannot be displaced in the longitudinal direction. A longitudinally extensible ring 60 is also interposed between the flange of the socket 50 and the flange of the sleeve 53. The whole of this puppet with dividing head is carried by the part 54, forming a hub, in a bearing 61 of a puppet-carrying segment 62 which can be angularly displaced in a vertical plane for adjusting the inclination of the wheel-carrying mandrel, being pivotally supported (Fig. 2) by a carrier 63, relatively to which the said segment 62 may be adjusted by means of a worm 64 gearing with teeth 65 of the carrier 63. The precise adjustment of the puppet-carrying segment 62 being effected by means of a graduation 66, it may be locked by bolts 67 (Figs. 1 and 2) engaging by means of a hook, behind a shoulder of the carrier 63.

Figure 2:
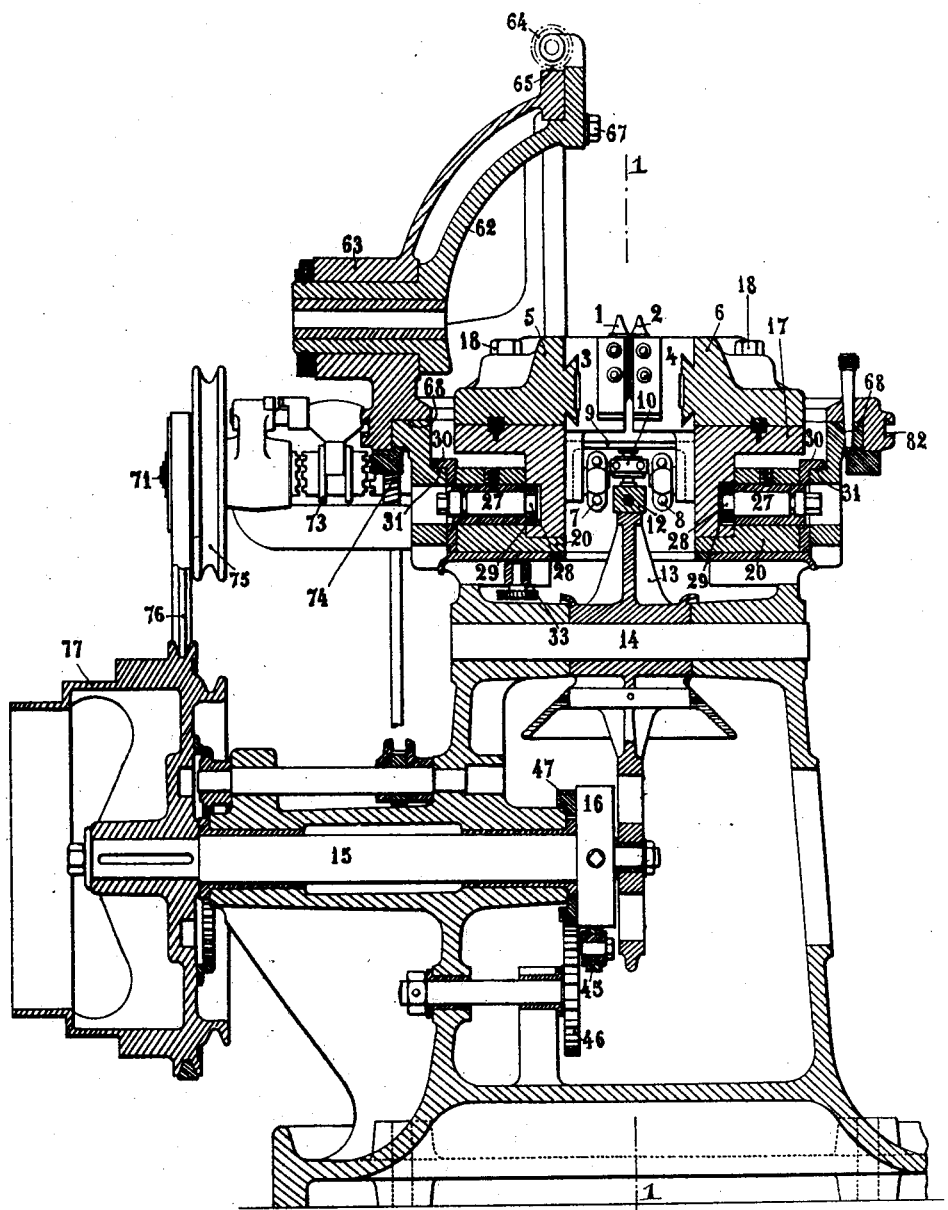
Fig. 2 is a vertical section at right angles to that of Fig. 1 and passing through the driving axis according to line 2—2 of Fig. 1.

The carrier 63 is mounted, in its turn, on the circular ledge 68 of the machine frame, so that it may rotate about the vertical axis of this frame with all the parts carried thereby. This movement of rotation of the carrier is intended to move little by little the carrier together with the wheel to be cut 48 opposite the planing tools, in such a manner that, at the beginning of the cutting of a tooth, the vertical plane passing through the axis of the wheels at the left of the azimuth of the tools, then moves towards it during the cutting and finally moves away towards the right until the termination of the cutting of the tooth. This movement of the carrier is obtained (Fig. 4) by means of a circular rack 69 and of a worm 70 actuated by a shaft 71 which carries, on the one hand, a crank 72 for manual operation and, on the other hand, a claw sleeve 73. This claw sleeve allows of coupling the shaft 71, on one side, with a toothed wheel 74 loose on said shaft, but actuated from the driving shaft by a suitable transmission, so as to impart to it the slow-feeding movement; on the other side, this sleeve 73 may be engaged with a stepped pulley 75 connected by a belt 76 to the pulley 77, this second transmission being arranged for producing the rapid and automatic return of the carrier 63 when a tooth has been cut. The displacement of the sleeve 73 may be effected by hand (Fig. 5) by means of an operating rod 78 provided with a handle 79, for starting the cutting operation. This displacement is effected automatically, in the reverse direction, for the rapid return, by means of tappets 80 and 81 movable in a circular groove 82 provided in the periphery of the base of the carrier 63 (Figs. 1 and 2).

The rotation of the body of the wheel 48 for the cutting of each tooth is effected, during the rotation of the carrier 63, by means of two arched guide levers 83—84 which embrace, by a forked end (Fig. 6), a trunnion 85 carried by an arched arm 86 secured to the box 55 of the dividing device by means of four clamping bolts 87 and provided with a longitudinal slide in which passes the socket 50 of the wheel-carrying puppet. The guide-levers 83—84 are journalled in a curved fixed supporting bar 88, so that their pivotal point may be adjusted along this bar. For that purpose, each lever is held by a two claw member 89 (Figs. 4 and 6) pivotally mounted at 90 on a slide block 91 adjustably carried by the fixed bar 88 and which may be moved thereon according to the requirements, drawing along with it the said member 89, so as to cause a change in the position of the pivotal point of the lever. The arched arm 86 is urged by one or the other of the two coil springs 92 (each of which acts for a working rotary stroke in one direction). The action of this guide lever device is as follows:

When the carrier 63 with the puppet-carrying segment, is caused to rotate about the vertical axis, the arched arm 86 is actuated and as this arm has a bearing by means of the trunnion 85 at the bottom of the fork of one of the levers 83—84 (83 according to Fig. 6), it is compelled to rotate at the same time and to produce thereby a rotation of the body of the wheel 48 to be cut, about its own axis, the azimuth of this axis changing at the same time relatively to that of the travel of the planing tools, so that a combined movement takes place, determining the form of the wheel being cut with the tools, the driving device of the carrier being so constructed that the latter is moved forward only when the tools are out of reach of the wheel to be cut. In the first half of this rotary movement, starting from the position illustrated in Fig. 6, the trunnion 85, pressed on the lever 83 by one of the springs 92, will follow the arched path X to be taken up in the middle of its travel, at Y, by the fork of the lever 84 and find a bearing in the latter, still under the action of the spring 92, so as to describe an arc Z symmetric to X, these two paths X and Z corresponding, as to shape, to the cycloid arcs produced by the point of contact of the pitch circle of the wheel being cut; this will be understood if it is considered that, when a circle runs on a straight line, the point of contact describes cycloid arcs and that reversely, since the point of contact of the pitch circle of the wheel being cut describes two cycloid arcs, the rotation of the said wheel is perfect.

Of course, both levers 83—84 rock, during this rotary movement of the wheel to be cut, between the position illustrated in Fig. 6 and a position in which the trunnion 85 coincides with the middle Y of the fixed bar 88. The path described by the trunnion 85 may be modified to a certain extent by varying the position of the pivotal point of the guide levers 83—84. As marking position of the levers, I take that in which the trunnion 85 coincides with the middle Y of the bar 88 and in which it may be fixed by a fastening pin 93 passed through a socket 94 provided at that point of the said bar 88.

The trunnion 85 is adjustable in the slide of the arched arm 86. For that purpose, it is carried by a slide-block 95 (Figs. 1 and 4) guided in the slide of this arm 86 and capable of being secured therein by means of a small fastening plate 96 projecting above the edges of this slide and which may be secured in position by two hollow screws 97. The slide-block 95 is illustrated in cross section in Fig. 4. The coil springs 92 are adjustably attached to a tail piece of this slide-block, one of said springs only acting every time for helping to produce the rotation of the wheel to be cut.

98 (Fig. 1) is an adjustable abutment for the wheel 48 to be cut. It is to be noted that the central slide-block 9, which is provided with three balls, is guided in a guide formed in the cradle or saddle and parallel to the upper face of the saddle receiving the carriage guides 5 and 6. The use of two side links 7 and 8 is rendered necessary by the fact that the carriage-guides 6, 7 have a variable convergence, as the case may be, whilst the slide-block 9 always moves according to the axis of the saddle. In the same way, the third ball 9ᵃ of the slide-block 9 is also spherical, because the link 10, which connects it to the ball 11 of the nut 12, may occupy a very large number of positions, the ball of the slide-block participating both in the radial movement (with slight inclination with the horizontal) and the circular movement, whilst the ball of the said nut 12 describes an arc only in a vertical plane about the axis of oscillation 14 of the lever 13.

The shaft 15 being operated a radial alternative movement is imparted to the tools 1 and 2 in the bowl 20, through the medium of the eccentric plate 16, lever 13, the balls 11 and 9ᵃ, block 9, links 7 and 10, and carriages 3 and 4. At the same time the shaft 15 through the medium of the wheels 46 and 47 operates the crank 44 which imparts angular alternative movement to the arm 45, which movement is transmitted to the shaft 41, which through the medium of the sector 40 and pinions 39 operates the shafts 38, which in turn operates the shaft 35 through the medium of the pinions 36 and the toothed segments 37 carrying the slide-blocks 33. The slide-blocks by engaging the recesses of the bowl impart angular alternative movement to the bowl around the vertical axis, imparting to the tools a movement, the result of the two movements. The working of the tools remain exactly the same during all the time required for the cutting of a tooth. The wheel to be cut only moves in the well known way (generating system) during the time required for the cutting and according to its advance.

Claims:

1. A machine for cutting gears with helical or straight teeth, comprising: planing tools, a bowl having a curved recess mounted in the main frame and pivoting about the axis of the planing tools,—a saddle resting in the curved recess of the bowl,—tool-carrying carriages, guides for said carriages resting in the saddle,—means for adjusting the angular displacement of the base of the saddle for raising the tools according to the depth of the teeth to be obtained,—means for imparting to the planing tools a radial reciprocating movement and a circular reciprocating movement under the subjection of a predetermined and fixed law of the said radial alternating movement.

2. A machine for cutting gears with helical or straight teeth, comprising: planing tools, a bowl having a curved recess mounted in the main frame and pivoting about the axis of the planing tools,—a saddle resting in the curved recess of the bowl,—tool-carrying carriages, guides for said carriages resting in the saddle,—a screw-threaded rod pivoted to the base of the saddle,—a screw-threaded sleeve on the said rod, an operating knob for the said sleeve,—a boss on the frame, in which the said sleeve may rotate without moving longitudinally for obtaining the adjustment of the angular displacement of the base of the saddle and of the planing tools according to the depth of the teeth to be cut,—means for imparting to the planing tools a radial reciprocating movement and a circular reciprocating movement under the subjection of a predetermined and fixed law of the said radial reciprocating movement.

3. A machine for cutting gears with helical or straight teeth comprising: planing tools, a bowl having a curved recess and mounted in the main frame and pivoting about the axis of the planing tools,—a saddle resting in the curved recess of the bowl,—guides for the tool-carrying carriages resting in the saddle,—means for adjusting the angular displacement of the base of the saddle for raising the tools according to the depth of the teeth to be obtained,—carriages supporting the planing tools,—two driving links mounted on the said carriages and on a central slide-block,—a third link connecting the said slide-block to a ball integral with the control lever of the planing tools,—a crank shaft the eccentricity of which is adjustable, controlling the said lever and imparting to the said tools a radial reciprocating movement, these tools receiving at the same time, a circular reciprocating movement, to the left or to the right, invariably connected to the first movement.

4. A machine for cutting gears with helical or straight teeth, comprising: planing tools, a bowl having a curved recess and mounted in the main frame and pivoting about the axis of the planing tools,—a saddle resting in the curved recess of the bowl,—tool-carrying carriages, guides for said carriages resting in the saddle,—a screw-threaded rod pivoted to the base of the saddle,—a screw-threaded sleeve on the said rod,—an operating knob for the said sleeve,—a boss on the frame, in which the said sleeve may rotate without moving longitudinally for obtaining the adjustment of the angular displacement of the base of the saddle and of the planing tools according to the depth of the teeth to be cut,—a crank shaft the eccentricity of which is adjustable,—a rocking control lever actuated by the said crank shaft,—a ball integral with the said lever,—a link mounted on the said ball and on a slide-block, the said slide-block being connected by two links to the tool-carrying carriages,—a second crank shaft independent from the crank shaft actuating the control lever of the tools,—a pinion of the same diameter on each of these shafts, the said pinions gearing together,—a crank pin on the pinion of the second crank shaft,—a lever on the said crank pin,—a second crank pin on the last mentioned lever,—a second lever integral with an intermediate shaft actuated by the second crank pin,—toothed segments on the said intermediate shaft, gearing with bevel pinions on vertical shafts,—a cylindrical wheel at the opposite end of the said shafts,—a crank provided with a toothed segment gearing with each of the said cylindrical wheels,—a movable and removable slide-block, fitted on one of the cranks and in one of the two diametrically opposite recesses provided in the bowl, for simultaneously obtaining, during the rotation of the first crank shaft, a radial reciprocating movement and a circular reciprocating movement, to the left or to the right of the planing tools, invariably connected to the former movement and determining according to the position of the slide-block, either a left hand helix, or a symmetrical right hand helix, the said slide-block allowing the cutting of wheels with straight teeth.

The foregoing specification of my machine for cutting bevel gears with helical or straight teeth signed by me, this 22nd day of December 1919.

VICTOR GASPARD DARTOIS.